US012600655B2

(12) United States Patent
Ahmed

(10) Patent No.: US 12,600,655 B2
(45) Date of Patent: Apr. 14, 2026

(54) HYBRID SOLAR STILL AND ANAEROBIC MEMBRANE BIOREACTOR FOR WASTEWATER TREATMENT

(71) Applicant: KUWAIT INSTITUTE FOR SCIENTIFIC RESEARCH, Safat (KW)

(72) Inventor: Mohd Elmuntasir Ebrahim Ahmed, Safat (KW)

(73) Assignee: KUWAIT INSTITUTE FOR SCIENTIFIC RESEARCH, Safat (KW)

( * ) Notice: Subject to any disclaimer, the term of this patent is extended or adjusted under 35 U.S.C. 154(b) by 0 days.

(21) Appl. No.: 19/329,762

(22) Filed: Sep. 16, 2025

(65) Prior Publication Data

US 2026/0015274 A1 Jan. 15, 2026

Related U.S. Application Data

(63) Continuation of application No. PCT/IB2023/052583, filed on Mar. 16, 2023.

(51) Int. Cl.
*C02F 9/00* (2023.01)
*C02F 1/30* (2023.01)
(Continued)

(52) U.S. Cl.
CPC ............... *C02F 9/00* (2013.01); *C02F 1/30* (2013.01); *C02F 1/44* (2013.01); *C02F 3/2853* (2013.01);
(Continued)

(58) Field of Classification Search
CPC ...... C02F 9/00; C02F 1/30; C02F 1/44; C02F 3/2853; C02F 3/2893; C02F 2301/046
(Continued)

(56) References Cited

U.S. PATENT DOCUMENTS 10,875,802 B2 12/2020 Yeh et al.
2010/0072130 A1 3/2010 Fane et al.
(Continued)

FOREIGN PATENT DOCUMENTS

CN 104355405 B 2/2016
CN 105859057 A * 8/2016 ................ C02F 9/00
(Continued)

OTHER PUBLICATIONS

Machine-generated English translation of CN 105859057, generated on Oct. 29, 2025.*
(Continued)

*Primary Examiner* — Fred Prince
(74) *Attorney, Agent, or Firm* — Nath, Goldberg & Meyer; Joshua B. Goldberg

(57) ABSTRACT

The hybrid solar still and anaerobic membrane bioreactor for wastewater treatment (10) produces both purified water (PW) and biogas by combining a solar still (11) with an anaerobic membrane bioreactor. The solar still (11) receives feed wastewater (WW) and produces condensed water (CW) and concentrated wastewater (CWW) therefrom through solar distillation. An anaerobic process tank (12) receives the concentrated wastewater (CWW) from the solar still (11) and produces digested waste sludge and a process liquid (PL) therefrom through anaerobic digestion. A membrane tank (20) receives the process liquid (PL) from the anaerobic process tank (12), and also receives the condensed water (CW) from the solar still (11). Through membrane filtration, the membrane tank (20) produces purified water (PW) and retained wastewater (RWW). The retained wastewater (RWW) is recirculated back to the anaerobic process tank (12).

10 Claims, 2 Drawing Sheets

(51) Int. Cl.
*C02F 1/44* (2023.01)
*C02F 3/28* (2023.01)

(52) U.S. Cl.
CPC ...... *C02F 3/2893* (2013.01); *C02F 2301/046*
(2013.01)

(58) Field of Classification Search
USPC ................................ 210/603, 252, 259, 601
See application file for complete search history.

(56) References Cited

U.S. PATENT DOCUMENTS

| | | | | |
|---|---|---|---|---|
| 2015/0144554 A1* | 5/2015 | Josse | | C02F 3/30 |
| | | | | 210/195.3 |
| 2015/0232360 A1 | 8/2015 | Song et al. | | |
| 2017/0081225 A1* | 3/2017 | Yeh | | A01G 9/14 |

FOREIGN PATENT DOCUMENTS

| | | | | | |
|---|---|---|---|---|---|
| CN | 112607961 | A | 4/2021 | | |
| CN | 115321748 | A * | 11/2022 | ............... | C02F 9/00 |
| EP | 2746231 | A1 * | 6/2014 | ............. | C02F 11/04 |
| KR | 2015-0096109 | A | 8/2015 | | |
| WO | WO-2018095580 | A1 * | 5/2018 | ........... | C12M 21/04 |

OTHER PUBLICATIONS

Machine-generated English translation of CN115321748, generated on Oct. 29, 2025.*
Bair et al., "Feasibility of anaerobic membrane bioreactors (AnMBR) for onsite sanitation and resource recovery (nutrients, energy and water) in urban slums," Water Sci Technol., 2015; 72(9):1543-1551, (abstract only).

* cited by examiner

HYBRID SOLAR STILL AND ANAEROBIC MEMBRANE BIOREACTOR FOR WASTEWATER TREATMENT

CROSS-REFERENCE TO RELATED APPLICATION

This application is a continuation of Patent Cooperation Treaty Application No. PCT/IB2023/052583, filed on Mar. 16, 2023, the entire contents of which are incorporated herein by reference.

TECHNICAL FIELD

The disclosure of the present patent application relates to wastewater treatment, and particularly to a combined solar still and anaerobic membrane bioreactor for wastewater treatment.

BACKGROUND ART

An anaerobic membrane bioreactor (AnMBR) is a reactor used for the treatment of wastewater. The AnMBR works by using a membrane bioreactor (MBR). Wastewater is filtered and separated, resulting in separate effluent and sludge. The sludge is treated anaerobically by mesophilic bacteria, which release methane as a byproduct. This biogas can later be combusted to generate heat or electricity. AnMBR is considered to be a sustainable alternative for wastewater treatment because the energy that can be generated by the methane combustion can exceed the energy required for maintaining the process.

FIG. 2 illustrates a typical AnMBR 100. An anaerobic digester process tank 112 includes a wastewater area 114 and a headspace 116. Raw wastewater (WW) enters the wastewater area 114 through a feed line 118, typically by way of a pump or gravity feed. Digested waste sludge leaves the process tank 112 through a drain 120. The bioreactor 100 also has a distinct membrane tank 120 containing an immersed membrane filter 122. The membrane filter 122 is typically in the microfiltration or ultrafiltration range. The membrane filter 122 is also typically arranged for outside-in flow and made to a solids tolerant design, for example, using flat sheet membranes or reinforced hollow fiber membranes. Both the process tank 112 and membrane tank 120 are sealed in the sense that, although they have various inlets and outlets, they are still pressurized without material biogas leaking.

Wastewater being treated recirculates between the process tank 112 and the membrane tank 120. Wastewater flows from the process tank 112 to the membrane tank 120 through a process liquid line 124. A portion of the wastewater entering the membrane tank 120 permeates through the membrane filter 122 and leaves the membrane tank 120 through a permeate line 128 as purified water (PW). Retained wastewater flows from the membrane tank 120 to the process tank 112 through a process liquid recirculation line 126. On average, the flow rate in the process liquid recirculation line 126 is less than the flow rate in the process liquid line 124 by the rate of permeate produced through the permeate line 128. Typically, flow in one direction between the process tank 112 and the membrane tank is by a pump (not shown), and in the other direction, by a pump or by a difference in pressure in the wastewater between the tanks 112, 120.

Biogas is created by microorganisms digesting the wastewater, and travels into the headspace 116. Some biogas is taken from the headspace 116 and passes through a gas sparging line 130 into the membrane tank 120, typically by way of a pump (not shown) in the gas sparging line. The biogas typically enters the membrane tank 120 through a gas sparger (not shown) near or below the bottom of the membrane filter 122. The gas is released as bubbles, which rise through or in contact with the membrane filter 122 to inhibit fouling of the membranes and generate liquid flow through the membrane filter 122. The bubbles burst at the surface of wastewater in the membrane tank 120 and release biogas into a pocket at the top of the membrane tank 120. The released biogas then returns to the process tank 112 through a gas recirculation line 132. By managing the process liquid recirculation and the pump in the gas sparging line 130, or both, the biogas in the membrane tank 120 can be kept at slightly higher pressure then the biogas in the process tank 112 to drive the return of biogas to the process tank 112.

Although the AnMBR has proven successful for small-scale wastewater treatment, it suffers from several issues that prevent its adaptation for large-scale treatment of wastewater, such as mainstream treatment of sewage. Specifically, the AnMBR suffers from membrane fouling, which, on the large scale of sewage treatment, would require constant maintenance and replacement. Further, the overall process configuration and relatively high process temperature makes implementation on a large scale very difficult. Additionally, the high sulfate concentration and the low organic concentration in sewage make the anaerobic process difficult.

According to the present teaching, the above challenges of adapting the AnMBR to large scale treatment, such as sewage treatment, may be overcome by adjusting the characteristics of the wastewater being fed into the anaerobic process tank and the process liquid fed to the membrane tank. Thus, a hybrid solar still and anaerobic membrane bioreactor for wastewater treatment solving the aforementioned problems is desired.

DISCLOSURE

The hybrid solar still and anaerobic membrane bioreactor for wastewater treatment produces both purified water and biogas by combining a solar still with an anaerobic membrane bioreactor. The solar still receives feed wastewater and produces condensed water and concentrated wastewater therefrom through solar distillation. An anaerobic process tank receives the concentrated wastewater from the solar still and produces digested waste sludge and a process liquid therefrom through anaerobic digestion. A membrane tank receives the process liquid from the anaerobic process tank, and also receives the condensed water from the solar still. Through membrane filtration, the membrane tank produces purified water and retained wastewater. The retained wastewater is recirculated back to the anaerobic process tank.

The anaerobic process tank may have a drain for selectively releasing the digested waste sludge, and may also have a vent for selectively releasing excess biogas. Further, the membrane tank may receive sparged biogas from the anaerobic process tank and recirculate released biogas back to the anaerobic process tank.

These and other features of the present subject matter will become readily apparent upon further review of the following specification and drawings.

BRIEF DESCRIPTION OF THE DRAWINGS

Similar reference characters denote corresponding features consistently throughout the attached drawings.

BEST MODE(S)

Figure 1:
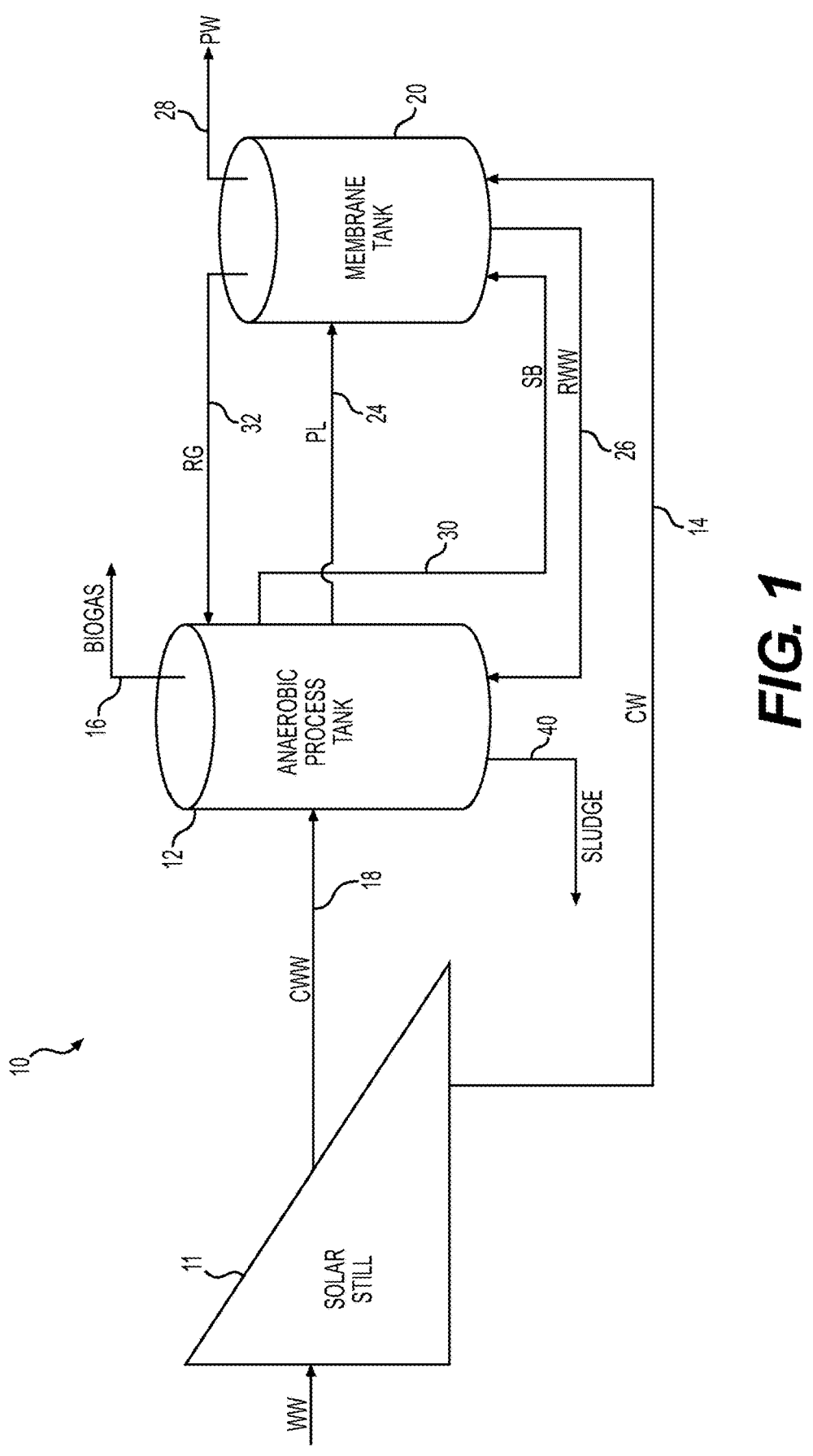
FIG. 1 is a schematic diagram of a hybrid solar still and anaerobic membrane bioreactor for wastewater treatment.
Figure 2:
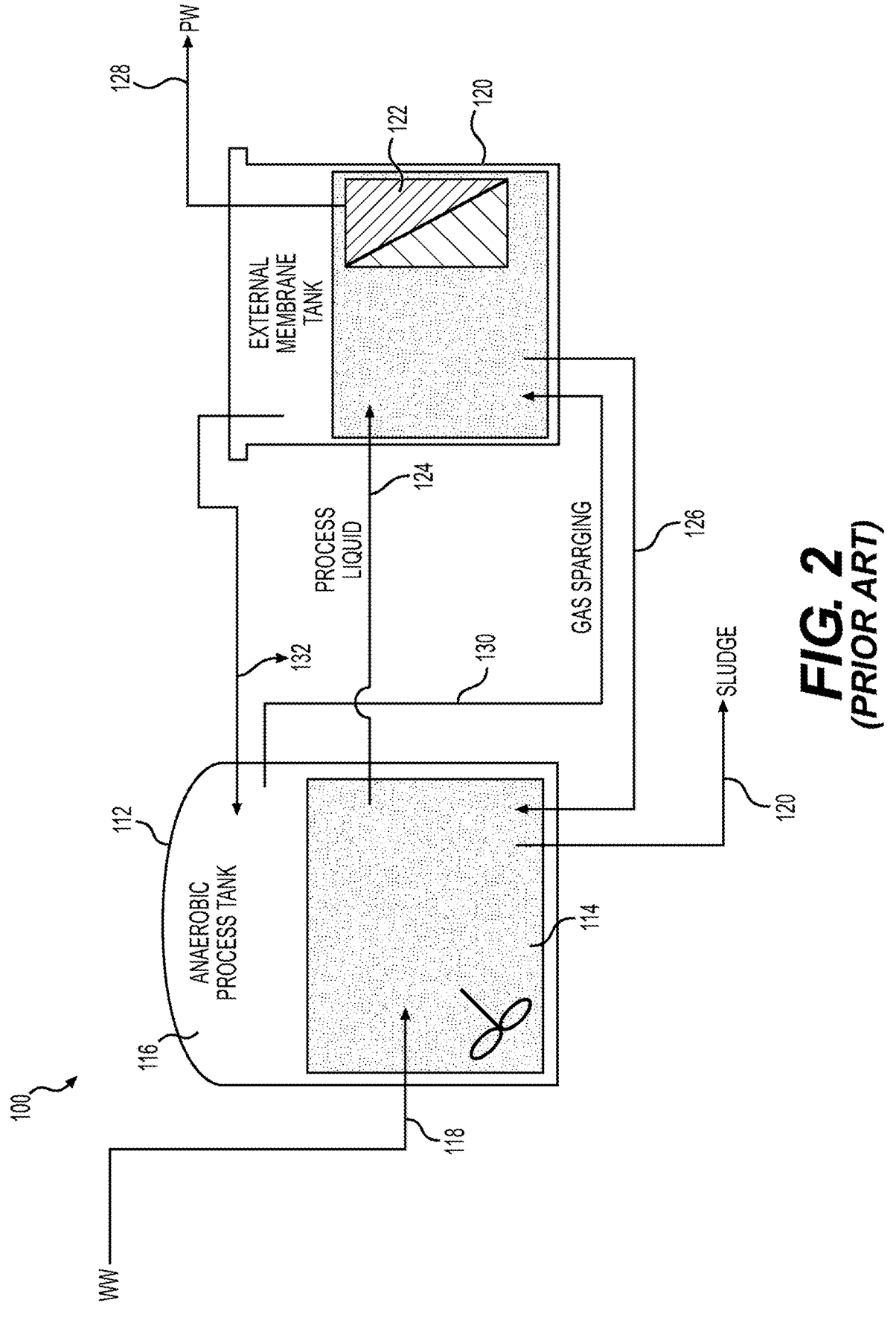
FIG. 2 is a schematic diagram of a conventional anaerobic membrane bioreactor of the prior art.

The hybrid solar still and anaerobic membrane bioreactor for wastewater treatment 10 is similar to the anaerobic membrane bioreactor (AnMBR) 100 of FIG. 2, but with the addition of a solar still 11. As is well-known in the art, solar stills distill water with substances dissolved therein, such as wastewater, by using the heat from solar radiation to evaporate water so that it may be cooled and collected, thus purifying the water and leaving a concentrated waste byproduct. In the hybrid solar still and anaerobic membrane bioreactor for wastewater treatment 10, the initial wastewater (WW) stream is fed into the solar still 11 such that the water contained therein may be evaporated and condensed, leaving behind a concentrated wastewater (CWW) byproduct. The concentrated wastewater is fed into the anaerobic process tank 12 through a feed line 18, and the operation of anaerobic process tank 12 is similar to that of anaerobic process tank 112 described above with regard to FIG. 2. Digested waste sludge leaves the anaerobic process tank 12 through a drain 40. It should be understood that solar still 11 may be any suitable type of solar still having any suitable configuration for producing condensed water and concentrated wastewater from the feed wastewater through solar distillation. It should be further understood that any necessary valves, ports, conduits, pumps, or the like, which are required to transport the concentrated wastewater from solar still 11 to the anaerobic process tank 12, may be used. Additionally, it should also be understood that the digested waste sludge may be selectively drained from anaerobic process tank 12 using any suitable type of valve, drainage port, or the like.

Similar to the AnMBR 100 of FIG. 2, the hybrid solar still and anaerobic membrane bioreactor for wastewater treatment 10 also includes a distinct membrane tank 20 containing an immersed membrane filter. The membrane tank 20 is similar in construction and operation to the membrane tank 120 of FIG. 2. Wastewater being treated recirculates between the process tank 12 and the membrane tank 20. The process liquid (PL) flows from the anaerobic process tank 12 to the membrane tank 20 through a process liquid line 24. It should be understood that any necessary valves, ports, conduits, pumps or the like, which are required to transport the process liquid from anaerobic process tank 12 to membrane tank 20, may be used.

In addition to the process liquid, the condensed water (CW) produced by the solar still 11 also enters the membrane tank 20 through line 14, thus diluting the process liquid within the membrane tank 20. A portion of the wastewater process liquid entering the membrane tank 20 permeates through the membrane filter and leaves the membrane tank 20 through a permeate line 28 as purified water (PW). It should be understood that any necessary valves, ports, conduits, pumps or the like, which are required to transport the condensed water from solar still 11 to the membrane tank 20, may be used. It should be further understood that the purified water may be extracted through permeate line 28 using any suitable type of valve, drain, pump or the like, and that the purified water may be collected and stored or be fed into a conduit or the like for transport thereof to any desired location or additional process or plant.

Retained wastewater (RWW) flows from the membrane tank 20 to the anaerobic process tank 12 through a process liquid recirculation line 26. It should be understood that any necessary valves, ports, conduits, pumps or the like, which are required to transport the retained wastewater from the membrane tank 20 back to anaerobic process tank 12, may be used. Biogas is created by microorganisms digesting the wastewater, and travels into the headspace of the anaerobic process tank 12. Some biogas is taken from the headspace, and this sparged biogas (SB) passes through a gas sparging line 30 into the membrane tank 20. It should be understood that any necessary valves, ports, conduits, pumps, blowers or the like, which are required to transport the sparged biogas from the anaerobic process tank 12 to the membrane tank 20, may be used.

As discussed above with regard to the AnMBR 100, the sparged biogas enters the membrane tank 20 through a gas sparger near or below the bottom of the membrane filter. The sparged biogas is released as bubbles, which rise through or in contact with the membrane filter to inhibit fouling of the membranes and generate liquid flow through the membrane filter. The bubbles burst at the surface of wastewater in the membrane tank 20 and release biogas into a pocket at the top of the membrane tank 20. The released biogas (RB) then returns to the anaerobic process tank 12 through a gas recirculation line 32. It should be understood that any necessary valves, ports, conduits, pumps, blowers or the like, which are required to transport the released biogas from the membrane tank 20 back to the anaerobic process tank 12, may be used.

Biogas may be selectively released as exhaust through a vent line 16, which may be connected, for example, to the headspace of the anaerobic process tank 12. The vent line 16 may be selectively opened by a suitable valve or the like when gas pressure exceeds a predetermined maximum and closes when gas pressure falls below a predetermined minimum. The predetermined minimum biogas pressure may be chosen to provide at least a material enhancement to transmembrane pressure differential and flux through the membrane filter of the membrane tank 20. This exhaust biogas may be collected or directly used as a power source. The biogas may be, or may contain, methane, which is a combustible gas that may be used to at least partially power the hybrid solar still and anaerobic membrane bioreactor for wastewater treatment 10.

It is to be understood that the hybrid solar still and anaerobic membrane bioreactor for wastewater treatment is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A hybrid solar still and anaerobic membrane bioreactor for wastewater treatment, comprising:

a solar still configured to receive feed wastewater and produce condensed water and concentrated wastewater therefrom;

an anaerobic process tank in fluid communication with the solar still configured to receive the concentrated wastewater therefrom and producing digested waste sludge and a process liquid therefrom; and a membrane tank in fluid communication with the anaerobic process tank configured to receive the process liquid therefrom, the membrane tank being in further fluid communication with the solar still configured to receive the condensed water therefrom, the membrane tank configured to produce purified water and retained wastewater, the retained wastewater configured to recirculate back to the anaerobic process tank.

2. The hybrid solar still and anaerobic membrane bioreactor for wastewater treatment as recited in claim 1, wherein the anaerobic process tank has a drain for selectively releasing the digested waste sludge.

3. The hybrid solar still and anaerobic membrane bioreactor for wastewater treatment as recited in claim 1, wherein the membrane tank further receives sparged biogas from the anaerobic process tank.

4. The hybrid solar still and anaerobic membrane bioreactor for wastewater treatment as recited in claim 3, wherein released biogas is recirculated from the membrane tank back to the anaerobic process tank.

5. The hybrid solar still and anaerobic membrane bioreactor for wastewater treatment as recited in claim 4, wherein the anaerobic process tank has a vent for selectively releasing excess biogas.

6. A method of treating wastewater, the method comprising:

feeding wastewater to a solar still and producing condensed water and concentrated wastewater therefrom through solar distillation;

feeding the concentrated wastewater from the solar still to an anaerobic process tank and producing digested waste sludge and a process liquid therefrom through anerobic digestion;

feeding the process liquid from the anaerobic process tank to a membrane tank;

feeding the condensed water from the solar still to the membrane tank to dilute the process liquid;

filtering the diluted process liquid in the membrane tank through a membrane filter to produce purified water and retained wastewater; and recirculating the retained wastewater back to the anaerobic process tank.

7. The method of treating wastewater as recited in claim 6, further comprising selectively draining the digested waste sludge from the anaerobic process tank.

8. The method of treating wastewater as recited in claim 6, further comprising feeding sparged biogas from the anaerobic process tank to the membrane tank.

9. The method of treating wastewater as recited in claim 8, further comprising recirculating released biogas from the membrane tank back to the anaerobic process tank.

10. The method of treating wastewater as recited in claim 9, further comprising selectively venting excess biogas from the anaerobic process tank.

* * * * *